United States Patent
Wang et al.

(10) Patent No.: US 11,548,132 B2
(45) Date of Patent: Jan. 10, 2023

(54) POWER TOOL

(71) Applicant: MOBILETRON ELECTRONICS CO., LTD., Taichung (TW)

(72) Inventors: Shih-Hao Wang, Tainan (TW); Jui-Chen Huang, Taichung (TW)

(73) Assignee: MOBILETRON ELECTRONICS CO., LTD., Taichung (TW)

(*) Notice: Subject to any disclaimer, the term of this patent is extended or adjusted under 35 U.S.C. 154(b) by 192 days.

(21) Appl. No.: 16/747,846

(22) Filed: Jan. 21, 2020

(65) Prior Publication Data

US 2020/0238497 A1 Jul. 30, 2020

(30) Foreign Application Priority Data

Jan. 30, 2019 (TW) .................. 108103546

(51) Int. Cl.
  *B25F 5/00* (2006.01)
  *G01D 5/14* (2006.01)
  (Continued)

(52) U.S. Cl.
  CPC ............ *B25F 5/001* (2013.01); *G01D 5/147* (2013.01); *G01K 7/22* (2013.01); *H02K 7/145* (2013.01);
  (Continued)

(58) Field of Classification Search
  CPC ........... B25F 5/001; B25F 5/00; G01D 5/147; G01D 5/145; G01K 7/22; H02K 7/145;
  (Continued)

(56) References Cited

U.S. PATENT DOCUMENTS 8,810,085 B2   8/2014   Matsunaga et al.
9,774,229 B1   9/2017   Mergener et al.
(Continued)

FOREIGN PATENT DOCUMENTS

CN   101786267 A   7/2010
CN   101997376 A   3/2011
(Continued)

OTHER PUBLICATIONS

Microchip (AN899), Jan. 8, 2004.*
(Continued)

*Primary Examiner* — John K Kim
(74) *Attorney, Agent, or Firm* — Apex Juris, PLLC; Hilde Coeckx; Tracy Heims

(57) ABSTRACT

A power tool includes a case, a motor, a plurality of Hall effect sensors, a first circuit board, and a second circuit board. The Hall effect sensors detect a position of a rotor of the motor and correspondingly generate position signals. A plurality of commutating switches and a first controller are disposed on the first circuit board. A second controller is disposed on the second circuit board, and could transmit a driving signal to the first controller according to the operating signal of an operator interface. The first controller regulates the commutating switches to commutate according to the driving signal and the position signals, thereby to activate the rotor to rotate. With such design, a commutation process and a user operating process are regulated by the two different controllers, which could efficiently simplify the program code installed in each of the controllers and facilitate the maintenance of the controllers.

9 Claims, 8 Drawing Sheets

(51) Int. Cl.
*G01K 7/22* (2006.01)
*H02K 7/14* (2006.01)
*H02K 11/215* (2016.01)
*H02K 11/33* (2016.01)
*B25B 21/00* (2006.01)

(52) U.S. Cl.
CPC ........... *H02K 11/215* (2016.01); *H02K 11/33* (2016.01); *B25B 21/00* (2013.01); *H02K 2211/03* (2013.01)

(58) Field of Classification Search
CPC .. H02K 11/215; H02K 11/33; H02K 2211/03; B25B 21/00; B25B 23/00; G01P 3/48
USPC ........................................................ 310/50
See application file for complete search history.

(56) References Cited

U.S. PATENT DOCUMENTS

| | | | | |
|---|---|---|---|---|
| 10,821,591 | B2* | 11/2020 | Verbrugge | B25F 5/00 |
| 2008/0036429 | A1* | 2/2008 | Leufen | F02M 15/04 322/46 |
| 2012/0074881 | A1* | 3/2012 | Pant | B25F 5/00 318/400.09 |
| 2013/0193891 | A1* | 8/2013 | Wood | H02P 6/08 318/434 |
| 2014/0131059 | A1* | 5/2014 | Verbrugge | B25F 5/00 173/217 |
| 2014/0312721 | A1 | 10/2014 | Matsunaga et al. | |
| 2014/0368144 | A1* | 12/2014 | Celik | H02P 6/28 318/400.22 |
| 2015/0365041 | A1* | 12/2015 | Reynolds | H02P 29/10 318/490 |
| 2017/0151657 | A1* | 6/2017 | Nagasaka | H01H 13/08 |
| 2017/0373620 | A1* | 12/2017 | Chang | H02P 6/00 |
| 2018/0326568 | A1* | 11/2018 | Fauteux | H02K 11/33 |
| 2018/0372806 | A1* | 12/2018 | Laughery | G01R 31/378 |
| 2019/0280560 | A1* | 9/2019 | Niwa | H02K 29/06 |
| 2019/0283222 | A1* | 9/2019 | Thorson | B25B 23/141 |
| 2019/0344461 | A1* | 11/2019 | Kamiya | B23D 45/16 |
| 2019/0363651 | A1* | 11/2019 | Wang | H02K 5/225 |
| 2019/0375079 | A1* | 12/2019 | Kamiya | B25B 19/00 |
| 2020/0238497 | A1* | 7/2020 | Wang | G01K 7/22 |

FOREIGN PATENT DOCUMENTS

| | | |
|---|---|---|
| CN | 102666024 B | 6/2016 |
| CN | 206344092 U | 7/2017 |
| CN | 206632411 U | 11/2017 |
| CN | 208063511 U | 11/2018 |
| TW | 201729957 A | 9/2017 |

OTHER PUBLICATIONS

Examination Report for TW108103546, dated Dec. 26, 2019, Total of 7 pages.
Search Report for TW108103546, dated Dec. 26, 2019, Total of 1 page.
English Abstract for CN101786267, Total of 1 page.
English Abstract for CN206632411, Total of 1 page.
English Abstract for TW201729957, Total of 1 page.
English abstract for CN102666024, Total of 1 page.
Search report for TW108103546, dated Jun. 7, 2021, Total of 1 page.
Search report for CN201910112451.7, dated Feb. 9, 2021, Total of 1 page.
English abstract for CN101997376, Total of 1 page.
English abstract for CN206344092, Total of 1 page.
English abstract for CN208063511, Total of 1 page.
Search report for CN201910112451.7, dated Dec. 28, 2021, Total of 2 pages.

\* cited by examiner

POWER TOOL

BACKGROUND OF THE INVENTION

Technical Field

The present invention relates generally to a power tool, and more particularly to a power tool which facilitate writing and maintaining a program code.

Description of Related Art

As shown in FIG. 1 and FIG. 2, a conventional power tool 1 includes a case 10, a motor 12, a Hall effect sensor 14, a controller 16, and a commutating switch 18; wherein the case 10 includes a transmission portion 101 and a holding portion 102. The motor 12, which is a three-phase DC brushless motor, and an actuator (not shown) are disposed in the transmission portion 101. The holding portion 102 is disposed with an operator interface 20 for operating by a user to generate an operating signal.

The Hall effect sensor 14 is electrically connected to the controller 16, and the commutating switch 18 is electrically connected to the motor 12 and the controller 16. The Hall effect sensor 14 is used for detecting a position of a rotor of the motor 12 and generating a feedback signal which is transmitted to the controller 16. The controller 16 determines the feedback signal and transmits a control signal to the commutating switch 18 to control a commutation of the motor 12 and activate the rotor of the motor 12 to rotate.

When the user operates the operator interface 20, the operating signal, such as speed signal, rotation direction signal, brake signal, and so on, is generated. After the operating signal is received by the controller 16, a control signal is generated by the controller and is transmitted to the commutating switch 18, in order to control the motor 12. As we learned from the above, a commutation process of the motor and a user operating process of the conventional power tool 1 are controlled and operated by the controller 16. As a result, a program code written in the controller 16 is complex and is hard to maintain.

BRIEF SUMMARY OF THE INVENTION

In view of the above, the primary objective of the present invention is to provide a power tool that simplifies a program code of a controller, which is beneficial to write and maintain the program code.

The present invention provides a power tool, which includes a case, a motor, a plurality of Hall effect sensors, a first circuit board, and a second circuit board.

The case includes a transmission portion, a holding portion, and a bottom, wherein the holding portion is disposed between the transmission portion and the bottom. The motor and the Hall effect sensors are disposed in the transmission portion, and the Hall effect sensors are adapted to detect a position of a rotor of the motor, thereby to correspondingly generate a position signal. The first circuit board is disposed in the holding portion, wherein a plurality of commutating switches and a first controller are disposed on the first circuit board. The first controller is electrically connected to the commutating switches and the Hall effect sensors. The commutating switches are electrically connected to the motor. The first controller receives a driving signal and regulates the commutating switches to commutate in accordance with the driving signal and the position signal, thereby to activate the rotor of the motor to rotate. The second circuit board is disposed in the bottom and is electrically connected to the first circuit board by a transmission wire assembly, wherein a second controller is disposed on the second circuit board, and transmits the driving signal to the first controller via the transmission wire assembly.

With the aforementioned design, the power tool could simplify the program code built in the conventional controller and facilitate the maintenance of the program code through transmitting the driving signal from the second circuit board to the first circuit board, and controlling the rotor of the motor to commutate via the first circuit board.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
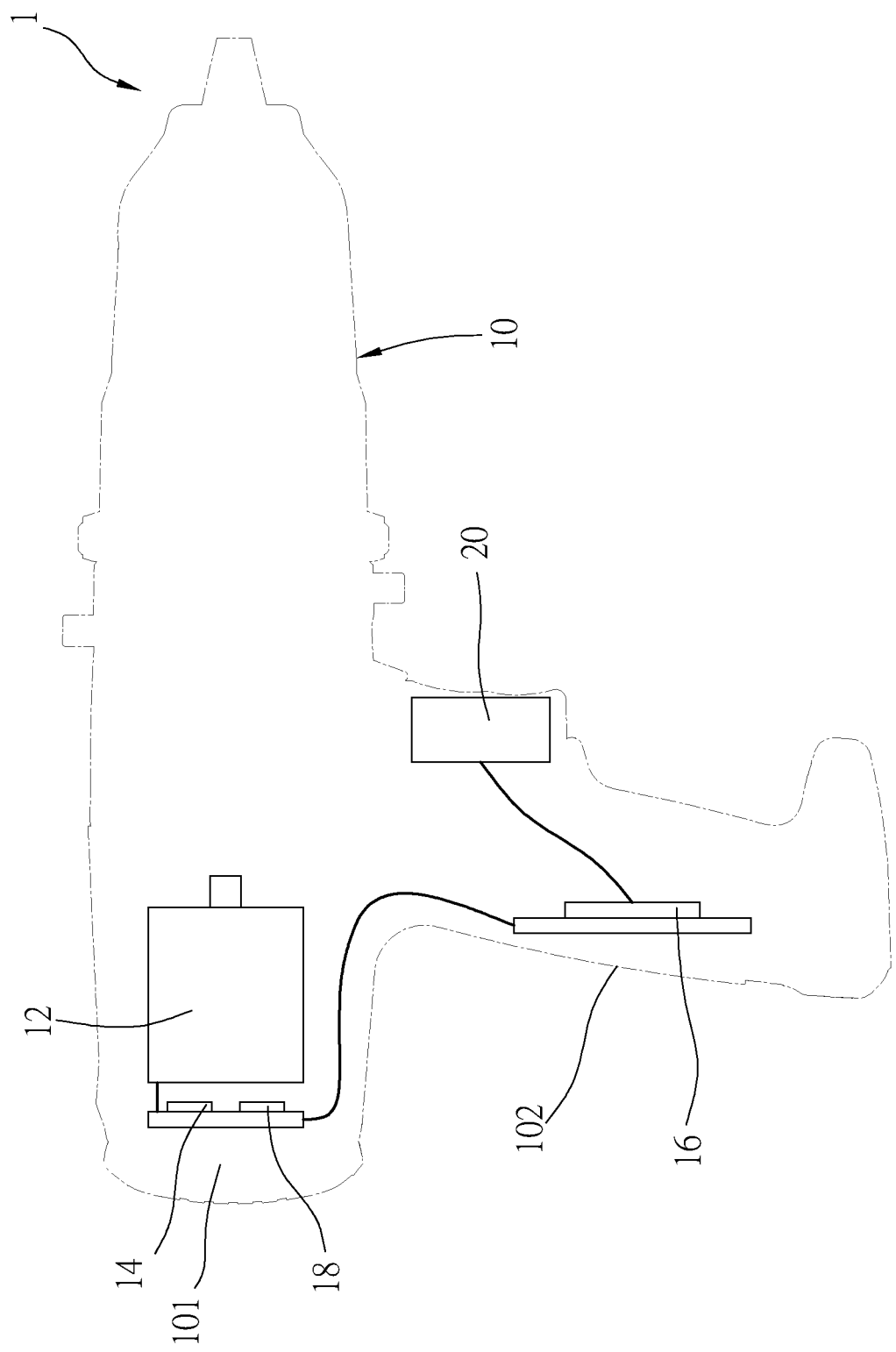
FIG. 1 is a schematic diagram of the conventional power tool.
Figure 2:
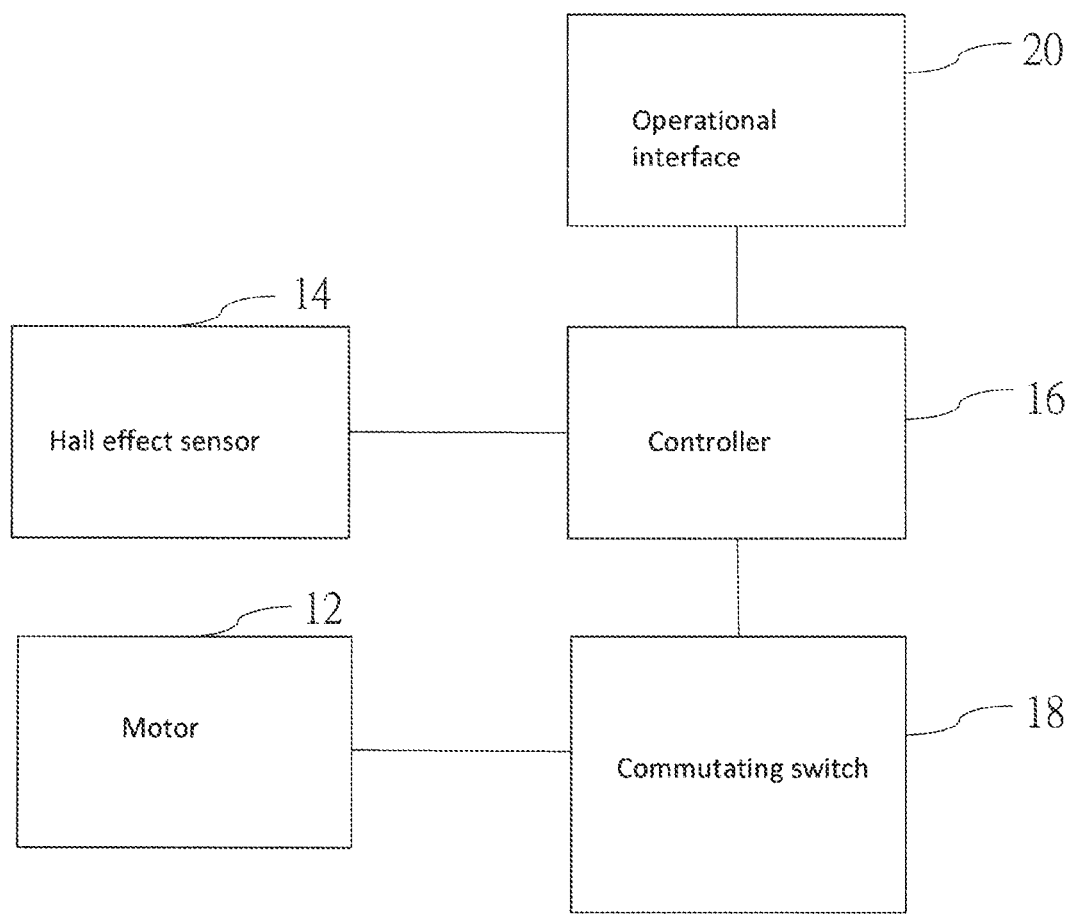
FIG. 2 is a system block diagram of the conventional power tool.
Figure 3A:
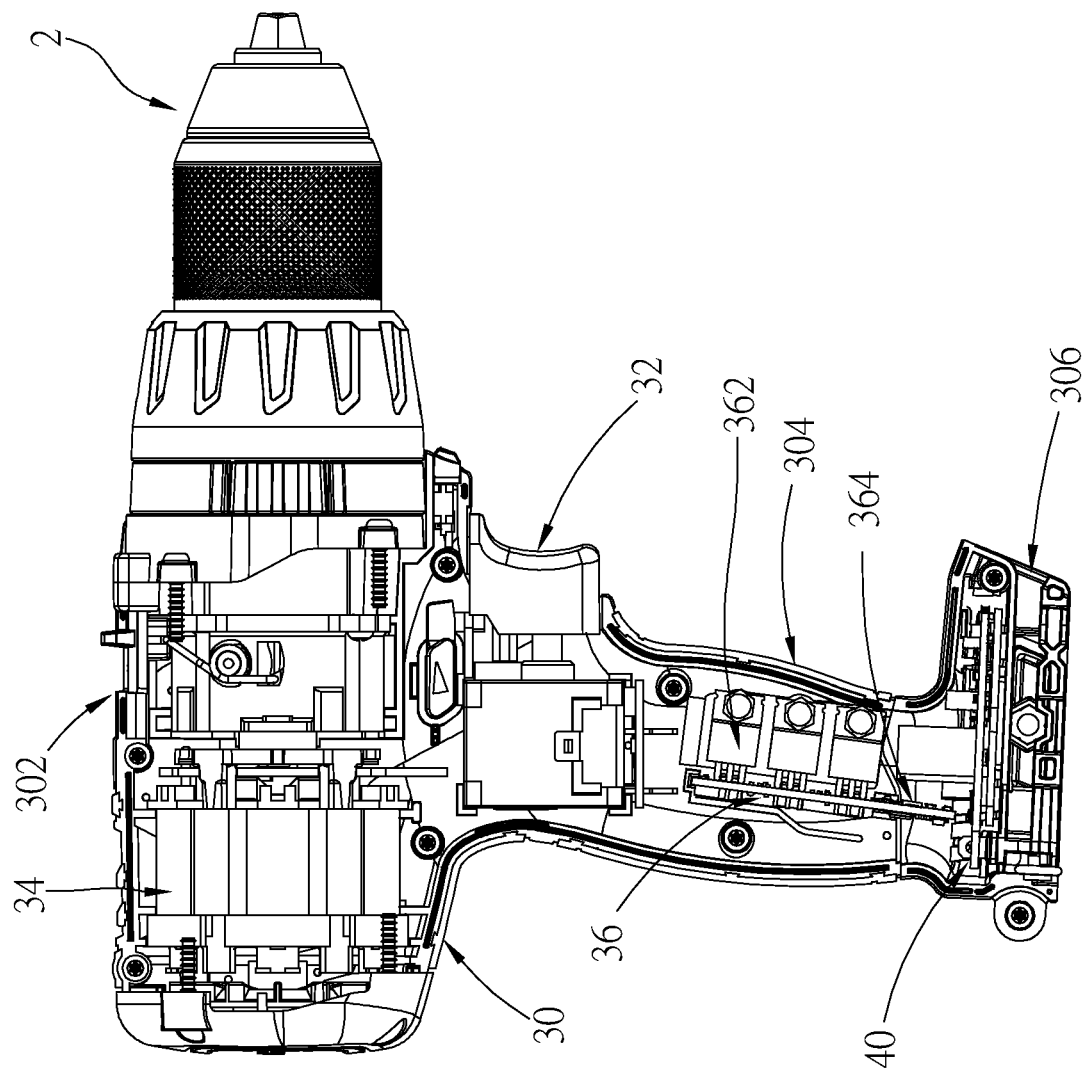
FIG. 3A is a schematic diagram of the power tool of an embodiment according to the present invention.
Figure 3B:
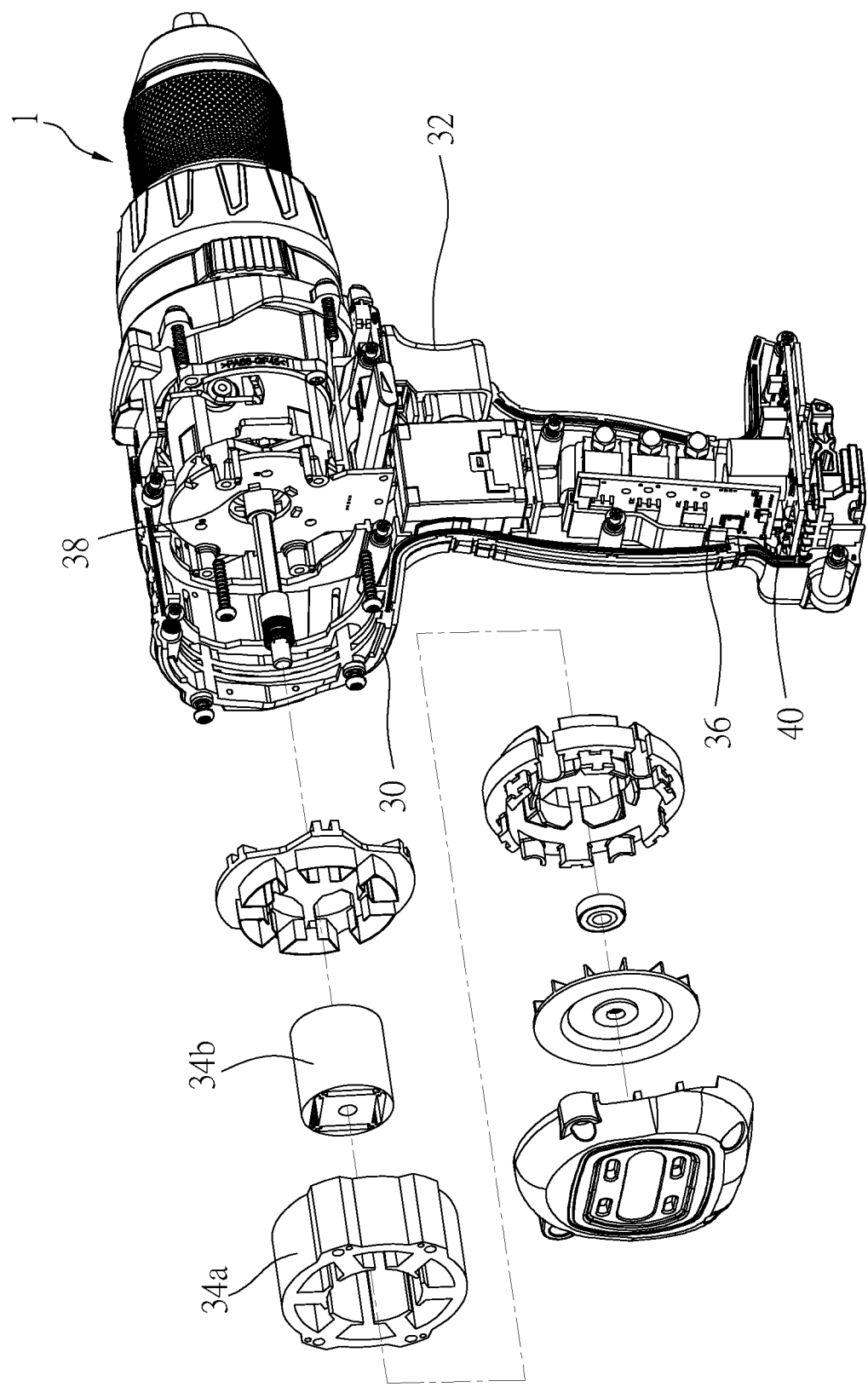
FIG. 3B is an exploded diagram of the power tool shown in FIG. 3A.
Figure 4:
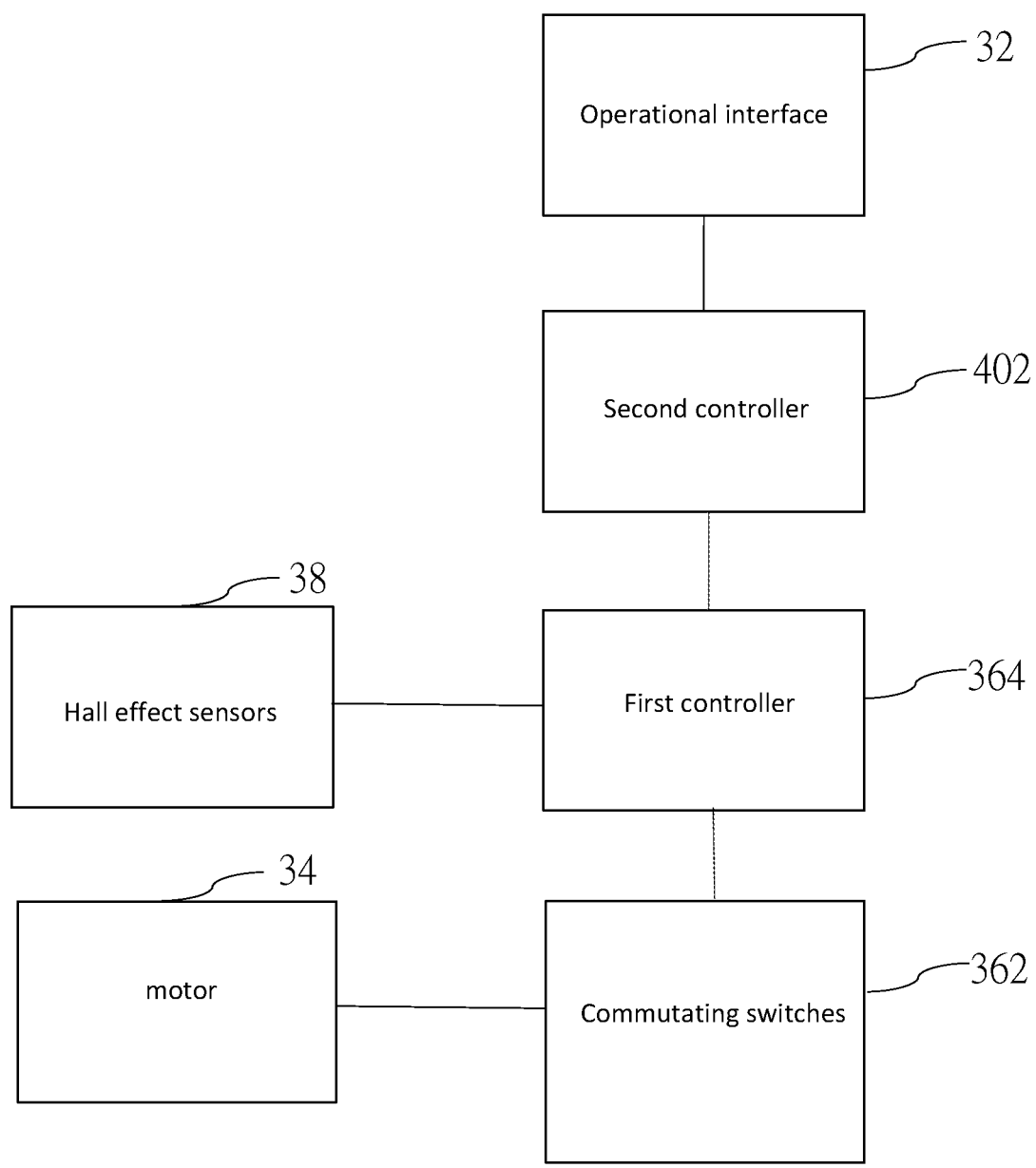
FIG. 4 is a system block diagram of the power tool of the embodiment.

A power tool 2 of an embodiment according to the present invention is illustrated in FIG. 3 to FIG. 6 and includes a case 30, a motor 34, a plurality of Hall effect sensors 38, a first circuit board 36, and a second circuit board 40.

The case 30 includes a transmission portion 302, a holding portion 304, and a bottom 306, wherein the holding portion 304 is disposed between the transmission portion 302 and the bottom 306. The transmission portion 302 is adapted to be disposed by the motor 34 and an actuator (not shown). A shaft of the motor 34 is adapted to drive the actuator. The holding portion 304 is adapted to be held by a user. An operator interface 32 is mounted on the holding portion 304 and is adapted to be operated by the user to generate an operating signal. A battery (not shown) is mounted in the bottom 306 and is adapted to provide electricity for the power tool 2. In the current embodiment, the operating signal includes a starting command, a rotation direction command, a braking command, and a speed command Practically, the operating signal at least includes the starting command.

In the current embodiment, the motor 34 is a three-phase DC brushless motor 34, including a stator 34a and a rotor 34b. The shaft of the motor 34 is connected to the rotor 34b. The shaft protrudes outwardly from the motor 34 in a direction away from the stator 34a and is connected to the actuator.

The Hall effect sensors 38 are disposed in the transmission portion 302. In the current embodiment, the Hall effect sensors include three Hall effect sensors which are used for respectively detecting a position of the rotor 34b of the motor 34. An output of each of the Hall effect sensors 38 is shifted between a first voltage level V1 and a second voltage level V2. Whenever the rotor 34b rotates 120 degrees, the Hall effect sensors 38 respectively and sequentially output a pulse, thereby to form a position signal in a form of a pulse. In the current embodiment, the first voltage level V1 is a low voltage level as an example, and the second voltage level V2 is a high voltage level as an example.

The first circuit board 36 is disposed in the holding portion 304. A plurality of commutating switches 362 and a first controller 364 are disposed on the first circuit board 36, wherein the commutating switches 362 are six MOSFTs in the current embodiment, which are electrically connected to the stator 34a of the motor 34. The first controller 364 is electrically connected to the commutating switches 362 and the Hall effect sensors 38.

The second circuit board 40 is mounted in the bottom 306 of the case 30 and is electrically connected to the first circuit board 36 by a transmission wire assembly 42. The second circuit board 40 is electrically connected to the battery for receiving the electricity from the battery. The transmission wire assembly 42 includes a power wire and a ground wire, so that the electricity could be transmitted from the second circuit board 40 to the first circuit board 36.

The second circuit board 40 is electrically connected to the operator interface 32. A second controller 402 is mounted on the second circuit board 40. After the second controller 402 receives the operating signal from the operator interface 32, the operating signal is converted into a driving signal. After that, the driving signal is transmitted to the first controller 364 via the transmission wire assembly 42.

In this way, the first controller 364 receives the driving signal and regulates the commutating switches 362 to commutate in accordance with the driving signal and the position signals, and activates the rotor 34b of the motor to rotate. It is not necessary for the second controller 402 to respectively control the commutating switches 362 to commutate, since the commutation of the commutating switches 362 is regulated by the first controller 364 of the first circuit board 36. As a result, comparing to the conventional power tool, the power tool 2 according to the present invention could effectively reduce an amount of signal wires in the transmission wire assembly 42. Moreover, in the present invention, a commutation process of the motor 34 is controlled by the first controller 364, and a user operating process is controlled by the second controller 402. In this way, instead of using one controller to regulate all processes (e.g. the commutation process and the user operating process), using two controllers could effectively shorten and simplify a code installed in each of the first controller 364 and the second controller 402, which is beneficial to code maintenance.

Figure 5:
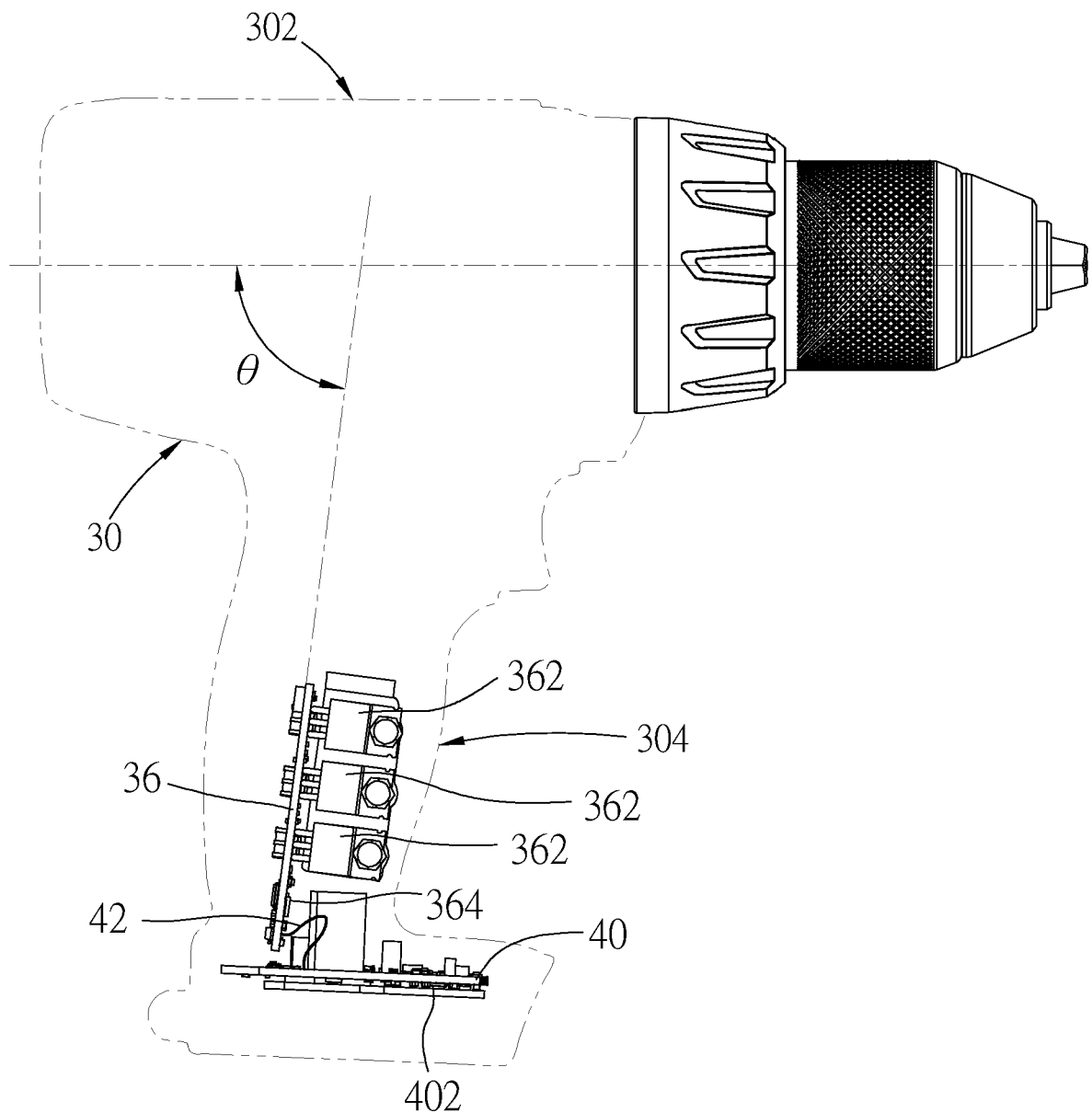
FIG. 5 is a schematic diagram, showing the angle between the first and second circuit board of the power tool of the embodiment.
Figure 6:
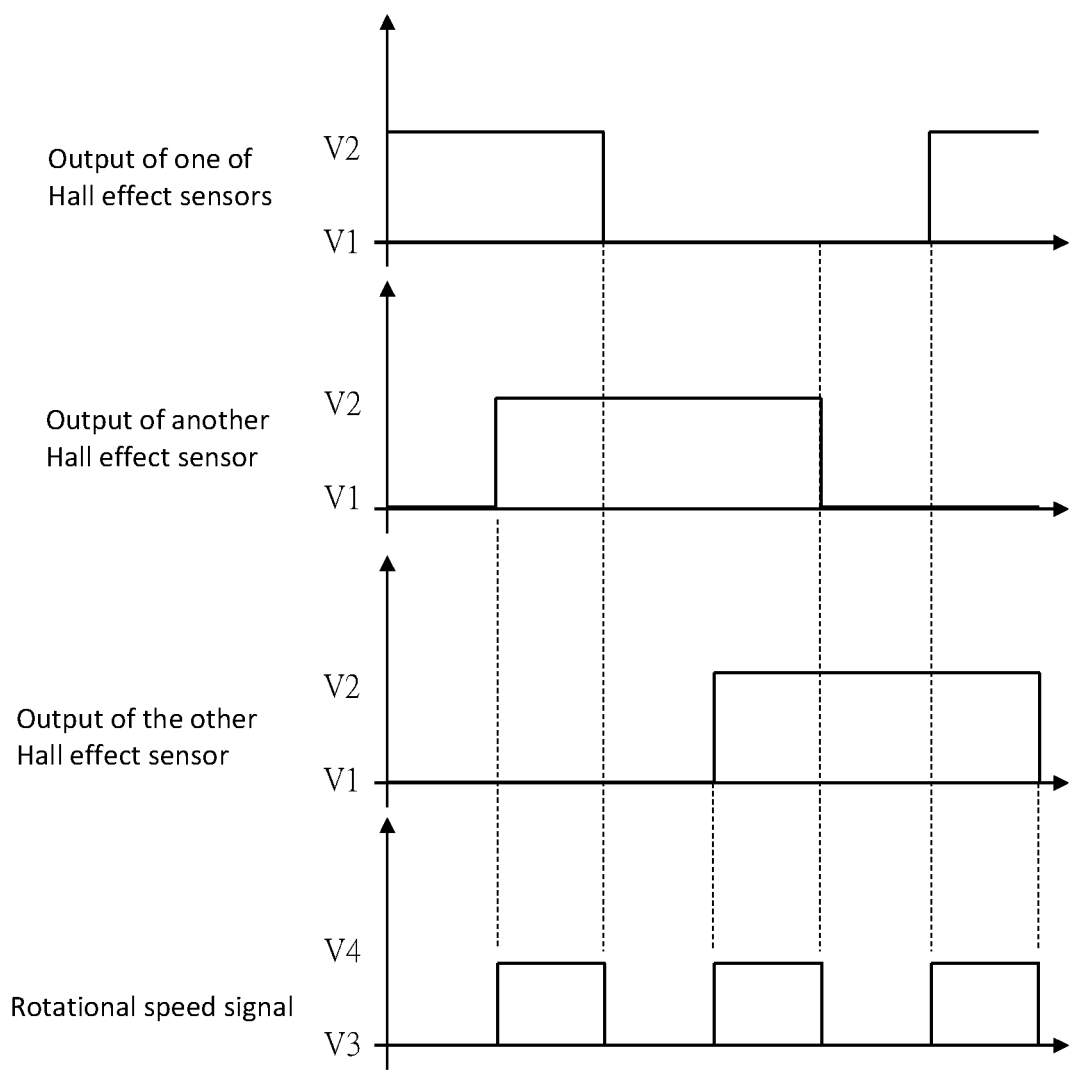
FIG. 6 is an oscillogram, showing the output of the three Hall effect sensors and the rotational speed signal of the power tool of the embodiment.

As shown in FIG. 5, in order to make the user hold the holding portions 304 more easily, the holding portion 304 is tilted at a tilting angle relative to the transmission portion 302. In order to effectively utilize an internal space of the case 30, in the current embodiment, an angle formed between an extension line of the first circuit board 36 and a horizontal axis of the transmission portion 302 is between 85 and 80 degrees, so that the first circuit board 36 is disposed along the tilting angle of the holding portion 304, and such design is beneficial to do the wiring inside the case 30.

In order to allow the second controller 402 to obtain a rotational speed of the rotor 34b of the motor 34 easier, in the current embodiment, the transmission wire assembly 42 includes a rotational speed signal wire. The first controller 364 converts the position signals detected by the Hall effect sensors 38 into a rotational speed signal, wherein the rotational speed signal is transmitted to the second controller 402 via the rotational speed signal wire, and the second controller 402 determines the rotational speed of the motor 34 by the rotational speed signal. Referring to the FIG. 6, in the current embodiment, the first controller 364 converts the position signals into the rotational speed signal by a way that when the output of each of the Hall effect sensors 38 is shifted from the first voltage level V1 to the second voltage level V2, the first controller 364 changes the rotational speed signal from a third voltage level V3 to a fourth voltage level V4, and when the output of each of the Hall effect sensors 38 is shifted from the second voltage level V2 into the first voltage level V1, the first controller 364 changes the rotational speed signal from the fourth voltage level V4 to the third voltage level V3. In the current embodiment, the third voltage level V3 is a low voltage level as an example, and the fourth voltage level V4 is a high voltage level as an example. In other words, whenever the rotor 34b rotates 120 degrees, the rotational speed signal has a cycle of pulse (referred as pulse cycle hereafter). When the rotor 34b rotates 360 degrees, the rotational speed signal has three pulse cycles. The second controller 402 calculates the rotational speed of the rotor 34b by the pulse cycles of the rotational speed signal. In this way, by integrating the output of the Hall effect sensors 38 as one output, the amount of signal wires of the transmission wire assembly 42 could be effectively reduced. Practically, the first controller 364 could also take the position signal from the output of one of the Hall effect sensors 38 as the rotational speed signal. The second controller 402 calculates the rotational speed of the rotor 34b by using the pulse cycle of the output of one of the Hall effect sensors 38.

Figure 7:
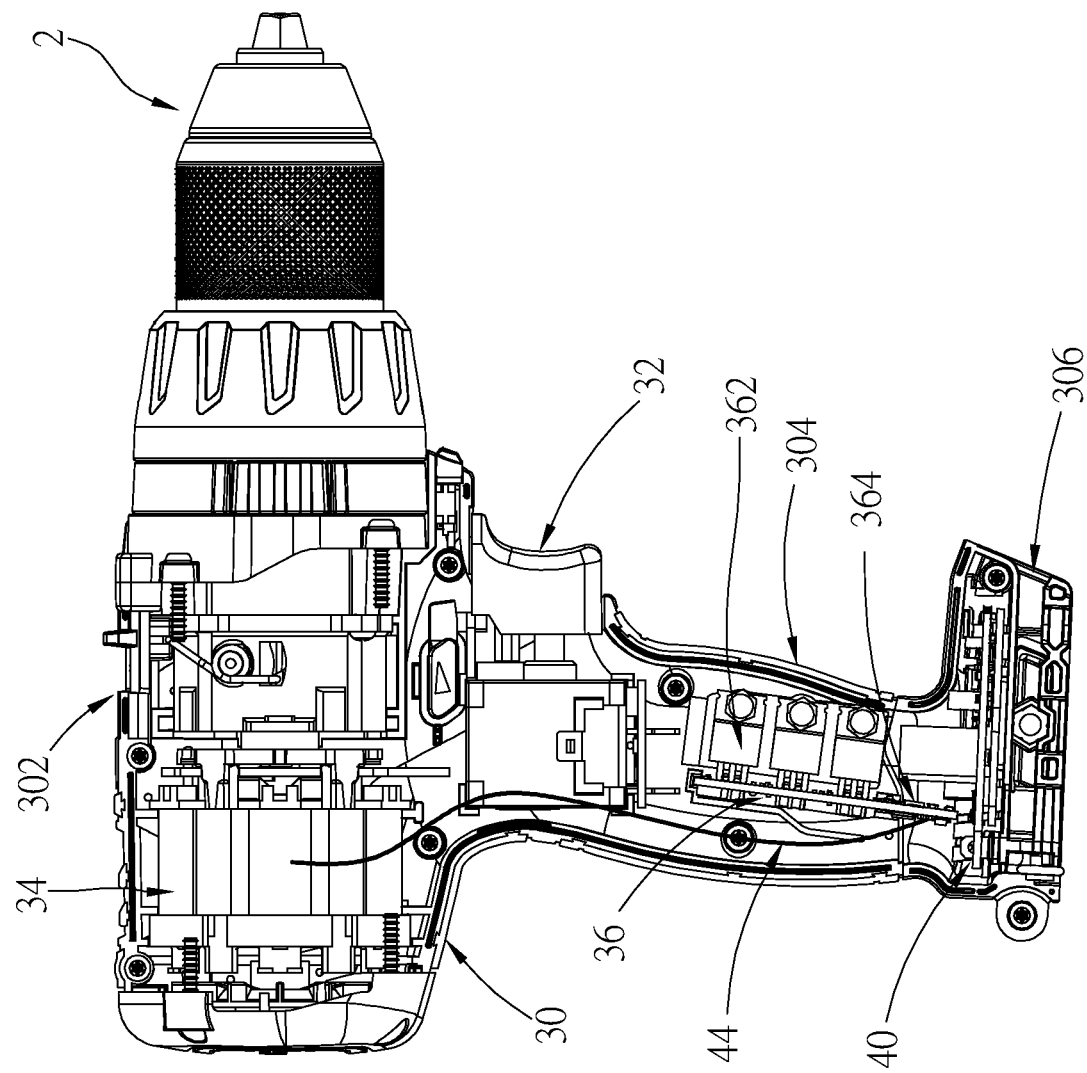
FIG. 7 is a schematic diagram, showing the temperature sensor of the power tool of the embodiment.

Additionally, the power tool 2 further includes a temperature sensor 44, as shown in FIG. 7. The temperature sensor 44 is disposed in the transmission portion 302 for detecting a temperature of the motor 34, wherein the temperature sensor 44 is electrically connected to the first controller 364. The transmission wire assembly 42 includes a temperature signal wire. After the temperature sensor 44 detects the temperature of the motor 34, the first controller 364 generates a temperature signal which is transmitted to the second controller 402 via the temperature signal wire. When the temperature of the motor 34 exceeds a predetermined temperature, the second controller 402 generates the driving signal to slow down or to stop the rotation of the motor 34, preventing the motor 34 from damage due to the excessive temperature caused by operating for a long period of time. Alternatively, said driving signal could speed up a cooling fan inside the power tool 2 to exhaust waste heat inside the power tool 2. However, the predetermined temperature is not limited to one certain value, but could be modified depending on features of the applied motor. The temperature sensor 44 includes, but not limited to, an NTC-resistor (NTC is an abbreviation of negative temperature coefficient).

In the current embodiment, the driving signal generated by the second controller 402 according to the starting command of the operating signal includes a speed command, a braking command, and a rotation direction command After the first controller 364 receives the driving signal, the first controller 364 regulates a commutation by the commutating switches 362 in accordance with the speed command so as to control the rotational speed of the rotor 34b, or stops the rotation of the rotor 34b via regulating the commutating switches 362 in accordance with the braking command, or adjusts a rotation direction of the rotor 34b via regulating the commutating switches 362 in accordance with the rotation direction command, so that the rotor 34b could rotate in a predetermined rotation direction set on the operator interface 32. In the current embodiment, the speed command is transmitted in a way of Pulse Width Modulation (PWM). Additionally, the transmission wire assembly 42 includes a speed signal wire, a braking signal wire, and a rotation direction signal wire, wherein the speed command, the brake command, and the rotation direction command are transmitted via the speed signal wire, the braking signal wire, and the rotation direction signal wire, respectively.

With the aforementioned design, the commutation process of the motor is processed by the first controller 364, and the user operating process is processed by the second controller 402. As a result, comparing to using one controller to control all process, using two controllers could effectively reduce and simplify the code built in each of the first controller and the second controller, which is facilitate the code maintenance. Moreover, it is also beneficial to the post-maintenance and troubleshooting. For instance, when either the commutation process or the user operating process has any error, the user could identify immediately that which circuit board is broken, thereby to check or replace the malfunctioned circuit board.

It must be pointed out that the embodiment described above is only a preferred embodiment of the present invention. All equivalent structures which employ the concepts disclosed in this specification and the appended claims should fall within the scope of the present invention.

What is claimed is:

1. A power tool, comprising:
   a case, which comprises a transmission portion, a holding portion, and a bottom, wherein the holding portion is disposed between the transmission portion and the bottom, and the bottom of the case is adapted to be coupled to a battery pack;
   a motor, which is mounted in the transmission portion;
   a plurality of Hall effect sensors, which are mounted in the transmission portion and are adapted to detect a position of a rotor of the motor, thereby to correspondingly and respectively generate a position signal;
   a first circuit board, which is arranged in the holding portion, wherein a plurality of commutating switches and a first controller are disposed on the first circuit board; the first controller is electrically connected to the plurality of commutating switches and the plurality of Hall effect sensors; the plurality of commutating switches are electrically connected to the motor; the first controller receives a driving signal and regulates the plurality of commutating switches to commutate in accordance with the driving signal and the position signal, thereby to activate the rotor of the motor to rotate; and
   a second circuit board, which is arranged in the bottom of the case and which is electrically connected to the first circuit board by a transmission wire assembly, wherein a second controller is disposed on the second circuit board, and transmits the driving signal to the first controller via the transmission wire assembly;
   an operator interface mounted on the case and adapted to be operated to generate an operating signal, wherein the second controller is electrically connected to the operator interface;
   wherein when the operator interface is operated to generate the operating signal, the second controller receives the operating signal and converts the operating signal into the driving signal;
   wherein an output of each of the plurality of Hall effect sensors is shifted between a first voltage level and a second voltage level; and
   wherein in a process of converting the plurality of position signals into a rotational speed signal by the first controller, the first controller changes the rotational speed signal from a third voltage level to a fourth voltage level when the output of each of the plurality of Hall effect sensors is shifted from the first voltage level to the second voltage level, and the first controller changes the rotational speed signal from the fourth voltage level to the third voltage level when the output of each of the plurality of Hall effect sensors shifts from the second voltage level to the first voltage level; and the rotational speed signal merely switches between the third voltage level and the fourth voltage level.

2. The power tool of claim 1, wherein an angle formed between an extension line of the first circuit board and a horizontal axis of the transmission portion is between 85 and 80 degrees.

3. The power tool of claim 1, wherein the rotational speed signal is transmitted to the second controller via the transmission wire assembly; the second controller determines a rotational speed of the motor according to the rotational speed signal.

4. The power tool of claim 1, further comprising a temperature sensor disposed in the transmission portion to detect a temperature of the motor.

5. The power tool of claim 4, wherein the temperature sensor is electrically connected to the first controller, and generates a temperature signal after detecting the temperature of the motor; the temperature signal is transmitted to the second controller via the transmission wire assembly.

6. The power tool of claim 4, wherein the temperature sensor comprises an NTC-resistor.

7. The power tool of claim 1, wherein the driving signal comprises a speed command.

8. The power tool of claim 7, wherein the speed command is transmitted in a way of PWM.

9. The power tool of claim 1, wherein the driving signal comprises a rotation direction command and a braking command.

* * * * *